(12) United States Patent
Garcia-Ferre et al.

(10) Patent No.: US 12,068,556 B2
(45) Date of Patent: Aug. 20, 2024

(54) CHARGING ARRANGEMENT FOR CHARGING OF ELECTRIC VEHICLES

(71) Applicant: ABB E-mobility B.V., Delft (NL)

(72) Inventors: Francisco Garcia-Ferre, Baden (CH); Moritz Boehm, Mellingen (CH); Emmanuel Logakis, Baden-Dättwil (CH); Jaroslav Hemrle, Baden-Dättwil (CH); Jean-marc Oppliger, Fislisbach (CH)

(73) Assignee: ABB E-mobility B.V., Delft (NL)

( * ) Notice: Subject to any disclaimer, the term of this patent is extended or adjusted under 35 U.S.C. 154(b) by 0 days.

(21) Appl. No.: 17/582,116

(22) Filed: Jan. 24, 2022

(65) Prior Publication Data

US 2022/0216640 A1    Jul. 7, 2022

Related U.S. Application Data

(63) Continuation of application No. PCT/EP2020/070852, filed on Jul. 23, 2020.

(30) Foreign Application Priority Data

Jul. 25, 2019    (EP) .................................... 19188472

(51) Int. Cl.
*H01R 13/50* (2006.01)
*B60L 53/16* (2019.01)
(Continued)

(52) U.S. Cl.
CPC ............ *H01R 13/504* (2013.01); *B60L 53/16* (2019.02); *B60L 53/18* (2019.02); *H01R 13/025* (2013.01);
(Continued)

(58) Field of Classification Search
CPC .. H01R 13/504; H01R 13/025; H01R 13/512; H01R 13/6335; B60L 53/16; B60L 53/18
(Continued)

(56) References Cited

U.S. PATENT DOCUMENTS

| 3,518,613 | A | 6/1970 | Alpert |
| 8,197,277 | B1 * | 6/2012 | Teichmann ........ H01R 13/6275 439/304 |

(Continued)

FOREIGN PATENT DOCUMENTS

| CN | 1626302 A | 6/2005 |
| CN | 202655175 U | 1/2013 |

(Continued)

OTHER PUBLICATIONS

European Patent Office, International Search Report in International Patent Application No. PCT/EP2020/070852, 4 pp. (dated Oct. 2, 2020).

(Continued)

*Primary Examiner* — Alexander Gilman
(74) *Attorney, Agent, or Firm* — Leydig, Voit & Mayer, Ltd.

(57) ABSTRACT

An arrangement for charging of electric vehicles includes a charging connector and a charging cable. The connector includes a connector body with first and second zones, the two zones being separate from each other. The first zone hosts a mating interface with electrical contacts for mating the connector with a corresponding socket of an electric vehicle. The electrical contacts are electrically coupled to the cable. The second zone includes a tube in which the cable is guided from an opening of the tube, which is arranged on that side of the second zone that faces away from the first zone to the electrical contacts, which are located in the first zone, and a handle for grabbing the (Continued)

connector with a human hand, the handle being separate from the tube. The second zone is Y-shaped where the tube is formed by one upper leg and the lower of the Y.

12 Claims, 4 Drawing Sheets (51) Int. Cl.
*B60L 53/18* (2019.01)
*H01R 13/02* (2006.01)
*H01R 13/504* (2006.01)
*H01R 13/512* (2006.01)
*H01R 13/633* (2006.01)
*H01R 107/00* (2006.01)

(52) U.S. Cl.
CPC ....... *H01R 13/512* (2013.01); *H01R 13/6335* (2013.01); *H01R 2107/00* (2013.01); *H01R 2201/26* (2013.01)

(58) Field of Classification Search
USPC .......................................................... 439/755
See application file for complete search history.

(56) References Cited

U.S. PATENT DOCUMENTS

| | | | | |
|---|---|---|---|---|
| 8,573,994 | B2* | 11/2013 | Kiko | B60L 3/0069 |
| | | | | 439/372 |
| 9,263,830 | B2* | 2/2016 | Sugiyama | B60L 53/16 |
| 9,300,086 | B1 | 3/2016 | Qu et al. | |
| 9,300,096 | B1 | 3/2016 | Chou et al. | |
| 10,446,961 | B1* | 10/2019 | Chang | H01R 24/38 |
| 11,180,043 | B2* | 11/2021 | Rönfanz | H01R 13/665 |
| 2011/0065305 | A1* | 3/2011 | Amit | H01R 31/06 |
| | | | | 439/368 |
| 2011/0149455 | A1* | 6/2011 | Ueno | B60L 53/31 |
| | | | | 361/87 |
| 2011/0171850 | A1* | 7/2011 | Brown, II | H01R 13/502 |
| | | | | 439/372 |
| 2015/0155656 | A1* | 6/2015 | Sugiyama | B60L 53/16 |
| | | | | 439/370 |
| 2016/0056589 | A1* | 2/2016 | Kagawa | B60L 3/00 |
| | | | | 361/42 |
| 2016/0272075 | A1* | 9/2016 | Biagini | B60L 53/22 |
| 2017/0259678 | A1* | 9/2017 | Cao | B60L 53/35 |
| 2018/0145442 | A1* | 5/2018 | Sanchez Patino | B29C 45/04 |
| 2018/0269619 | A1* | 9/2018 | Beimdieck | H01R 13/42 |
| 2019/0047426 | A1* | 2/2019 | Effenberger | B60L 53/665 |
| 2019/0058295 | A1* | 2/2019 | Beimdieck | B60L 53/16 |
| 2019/0074628 | A1* | 3/2019 | Fuehrer | H01R 13/5221 |
| 2019/0135131 | A1* | 5/2019 | Wenz | H01R 4/308 |
| 2019/0176653 | A1* | 6/2019 | Fuehrer | B60L 53/16 |
| 2019/0217729 | A1 | 7/2019 | Rönfanz et al. | |
| 2019/0217730 | A1* | 7/2019 | Götz | H01R 13/506 |
| 2020/0247254 | A1* | 8/2020 | Dellock | B60L 53/16 |
| 2020/0381874 | A1* | 12/2020 | Rose | H01R 13/111 |
| 2022/0216640 | A1* | 7/2022 | Garcia-Ferre | H01R 13/6335 |
| 2022/0234455 | A1* | 7/2022 | Fuehrer | B60L 53/302 |
| 2022/0324342 | A1* | 10/2022 | Ke | H01R 43/26 |
| 2022/0376525 | A1* | 11/2022 | Fuehrer | H02J 7/00714 |
| 2023/0096869 | A1* | 3/2023 | Garcia-Ferre | B60L 53/302 |
| | | | | 320/109 |

FOREIGN PATENT DOCUMENTS

| | | |
|---|---|---|
| CN | 102947125 A | 2/2013 |
| CN | 106888545 A | 6/2017 |
| CN | 206451907 U | 8/2017 |
| CN | 207128655 U | 3/2018 |
| CN | 108136926 A | 6/2018 |
| CN | 108367489 A | 8/2018 |
| CN | 108638905 A | 10/2018 |
| CN | 109318733 A | 2/2019 |
| CN | 109346878 A | 2/2019 |
| CN | 109519431 A | 3/2019 |
| CN | 109567305 A | 4/2019 |
| DE | 102013106448 A1 | 12/2014 |
| DE | 102013019882 A1 | 5/2015 |
| DE | 102016105371 A1 | 9/2017 |
| DE | 102017108526 A1 | 10/2018 |
| DE | 102018100829 A1 | 7/2019 |
| JP | 2016-184553 A | 10/2016 |

OTHER PUBLICATIONS

European Patent Office, Written Opinion in International Application No. PCT/EP2020/070852, 6 pp. (dated Oct. 2, 2020).
European Patent Office, Extended European Search Report in European Application No. 19188472.5, 7 pp. (dated Jan. 22, 2020).
European Patent Office, Office Action in European Patent Application No. 19188472.5, 6 pp. (May 30, 2022).
European Patent Office, Office Action in European Patent Application No. 19188472.5, 6 pp. (Nov. 17, 2023).

* cited by examiner

CHARGING ARRANGEMENT FOR CHARGING OF ELECTRIC VEHICLES

CROSS-REFERENCE TO PRIOR APPLICATIONS

This application is a continuation of International Patent Application No. PCT/EP2020/070852, filed on Jul. 23, 2020, which claims priority to European Patent Application No. EP 19188472.5, filed on Jul. 25, 2019. The entire disclosure of both applications is hereby incorporated by reference herein.

FIELD

One or more embodiments of the present disclosure relate to a charging arrangement for charging of electric vehicles, comprising a charging connector and a charging cable, wherein the charging connector comprises a connector body with a first zone and a second zone, the first zone and the second zone being separate from each other, the first zone of the connector body hosts a mating interface with electrical contacts for mating the charging connector with a corresponding socket of an electric vehicle, the electrical contacts being electrically coupled to the charging cable, and the second zone of the connector body comprises a tube in which the charging cable is guided from an opening of the tube which is arranged on that side of the second zone of the connector body which is faced away from the first zone of the connector body to the electrical contacts which are located in the first zone of the connector body, and a handle for grabbing the charging connector with a human hand, the handle being separate from the tube.

BACKGROUND

In response to global warming and pollution challenges, the automotive industry is accelerating the development and commercialization of electric vehicles. This trend has a high visibility and acceptance among end-customers. The business of electric vehicle charging infrastructure (EVCI) is therefore growing rapidly as well and there is currently a compelling need to support the automotive industry while ensuring—above all—safety, but also efficiency and performance.

At present, the EVCI products rely on connectors provided by a number of suppliers. Depending on the ratings (which in turn determine the charging speed for a given battery), the connectors may require either non-cooled or cooled cable systems. The connectors available in the market are based on well-known technologies (i.e., electrical contact solutions, cabling, and the like), but the application is rather new. As a matter of fact, the EVCI connector technology is at an early stage, and the connectors offered by suppliers are still first or second generation designs. The field-experience with this kind of devices is limited. Reasonable feedback on design, functionality, implementation, and operating performance is becoming available to engineers and designers just now. The available standards for EVCI applications are also at an early stage, and are currently rather weak and/or incomplete. A drawback of prior art liquid cooled charging connectors is an insufficient thermal performance of the cooling system.

Recent field service activities have shed light on a number of issues with the products installed in the field. Those issues have a relevant impact on safety and reliability, and must be addressed properly in order to protect end-users and our business, as well.

One major issue is the resistance of charging arrangements to mechanical damage, especially with respect to damage to the handle of the charging connector when unintentionally dropped.

Conventional charging arrangements as, for example, known from DE 10 2013 019 882 A1 are not yet well suited to resist shocks due to dropping and, hence, have a high risk of crashing during use. In detail, DE 10 2013 019 882 A1 describes a charging cable connector including an electrically-connector connector unit, a receptacle housing enclosing at least some sections of the connector unit, a charging cable connector section and a strain relieving device. The receptacle housing is a multi-part design and further includes a housing base section of closed outer surface design and a connector aperture. The housing base section is configured to accommodate the connector unit. The connector unit is accessible via the connecting aperture, where the connecting aperture is formed as part of the housing base section. The charging cable connector section is provided apart from the connecting aperture and further includes a charging cable connecting aperture. The charging cable connector section is configured to accommodate a charring cable. The charging cable includes a strain-relieving device, where the charging cable is configured to be guide via the charging cable connecting aperture into the receptacle Further, in DE 10 2013 106 448 A1 a similar design is shown. This document relates to an electrical plug connector, for example, for use in the field of electrical transportation. According to this document, an electrical plug connector for electrical connection to a mating electrical plug connector, having at least one electrical contact for contacting a mating electrical contact of the mating electrical plug connector, is provided, wherein a relief device is provided, which is designed and arranged in such a way that, in the connected state of the plug connector and the mating plug connector, the relief device produces a force, of which the main component acts vertically, between the front region of the plug connector and the front region of the mating plug connector. Thus, a plug connector for applications in electrical transportation shall be provided, which maintains the positioning in the charging socket even at high power/ weight ratios.

In addition, DE 10 2016 105 371 A1 relates to a similar plug connector part for plug-in connection to a mating plug connector part, which plug connector part comprises a housing part, which is produced from a first material, at least one plugging element arranged on the housing part for bringing into electrical contact with the mating plug connector part, and additionally an attachment part, which is placed against the housing part and detachably connected to the housing part and has at least one plugging section having an opening, in which the at least one plugging element is arranged, and is produced from a second material different from the first material. In this way, a plug connector part shall be provided which has a simple design, is economical to produce, and additionally is protected against wear and improper handling.

DE 10 2017 108 526 A1 also describes a similar charging plug for a motor vehicle, comprising a connection module and a load contact module; the connection module can be connected to supply lines for supplying power, while the load contact module includes a load contact for transmitting a charging power, is removably secured to the connection module, and also includes a temperature sensor.

The connector bodies described above are typically made of plastic, and, as already mentioned above, suffer from the risk of cracking and damage if repeatedly dropped. The same applies to the mating interface. Especially, the handle is very often damaged in an area close to the opening of the tube where the charging cable is inserted into the connector body, as this is where the connector typically hits the ground when it is dropped, due to the constraints coming from the stiffness of the charging cable.

SUMMARY

One or more embodiments of the present disclosure is directed to a charging arrangement for charging of electric vehicles. The charging arrangement includes a charging connector and a charging cable. The charging connector includes a connector body with a first zone and a second zone, the first zone and the second zone being separate from each other. The first zone of the connector body hosts a mating interface with electrical contacts for mating the charging connector with a corresponding socket of an electric vehicle, the electrical contacts being electrically coupled to the charging cable. The second zone of the connector body includes a tube in which the charging cable is guided from an opening of the tube that is arranged on a side of the second zone of the connector body that faces away from the first zone of the connector body to the electrical contacts, the electrical contacts being located in the first zone of the connector body, and a handle for grabbing the charging connector with a human hand, the handle being separate from the tube, wherein:

the second zone of the connector body is Y-shaped wherein the tube is formed by one upper leg and the lower of the Y and the handle is formed by the other upper leg of the Y, and the connector body has a multi-layer structure with a stiffer core layer and a softer outer layer.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

One or more embodiments of the present disclosure may provide a charging arrangement for charging of electric vehicles which is easy to use while showing high resistance to mechanical damage.

A charging arrangement for charging of electric vehicles comprises a charging connector and a charging cable, wherein the charging connector comprises a connector body with a first zone and a second zone, the first zone and the second zone being separate from each other, the first zone of the connector body hosts a mating interface with electrical contacts for mating the charging connector with a corresponding socket of an electric vehicle, the electrical contacts being electrically coupled to the charging cable, and the second zone of the connector body comprises a tube in which the charging cable is guided from an opening of the tube which is arranged on that side of the second zone of the connector body which is faced away from the first zone of the connector body to the electrical contacts which are located in the first zone of the connector body and a handle for grabbing the charging connector with a human hand, the handle being separate from the tube, wherein the second zone of the connector body is Y-shaped wherein the tube is formed by one upper leg and the lower leg of the Y and the handle is formed by the other upper leg of the Y.

Hence, it is a key issue of the present disclosure that the connector includes two zones which are separate from each other wherein the second zone is Y-shaped. The first zone contains the mating interface and the electric contacts of the electrical connector while in the second the first zone, a handle is separated from the cavity that contains the cable. This is advantageous because in case of overheating of the charging cable during charging this avoids potential burns to the hand of an end-user. The Y-shape makes it possible to reduce the risk of mechanical damages to the connector body when dropped while the connector may still be easily grabbed by a human hand.

The cable arrangement according to the present disclosure may be used as part of an electric vehicle supply equipment, EVSE, also referred to as electric vehicle, EV, charging station, electric recharging point, charging point, charge point, charge post or electronic charging station, ECS. The EVSE is an element in an infrastructure that supplies electric energy for recharging of electric vehicles, including electric cars, neighbourhood electric vehicles and plug-in hybrids. EVSEs usually comply with standards for electric vehicle fast charging, such as the so-called Combined Charging System, CCS, protocol according to IEC 61851-23 and SAE J1772 standard for charging electric vehicles both in the US and in the European Union, EU. The Combined Charging System, CCS, protocol is a fast charging method for charging electric vehicles delivering high-voltage direct current via a charging connector derived from SAE J1772 standard (IEC Type 1) or IEC Type 2 connector. Automobile manufactures that support CCS include Jaguar, Volkswagen, General Motors, BMW, Daimler, Ford, FCA, Tesla and Hyundai. The CSS standard is controlled by the so called CharIN consortium. Besides other protocols such as, for example, CHAdeMO, as abbreviation of CHArge de Move, or GB/T, in particular according to 20234.3-2011 standard. One or more embodiments of the present disclosure can be advantageously used with even higher charging currents such as more than 500 A or 600 A and/or in combination with newer standards not yet defined requiring higher currents.

In general, the two separate zones may be in a distance from each other. However, according to one implementation the two zones are directly adjacent to each other. The second zone of the connector body may be attached to the first zone of the connector body with both upper ends of the upper legs of the Y.

While, in general, it is possible that the tube follows a straight line, according to one implementation, the tube is curved, perhaps with a radius of curvature of more than 25 cm, more than 50 cm, or even more than 75 cm. In this way, sharp deformations and, hence, brakes of the cable can be avoided.

Though the present disclosure offers different designs, according to an implementation the lower end of the Y comprises the opening of the tube in which the charging cable is inserted. Further, the two upper legs of the Y are connected to each other by at least one bridge for reinforcing the handle. This makes the design even more resistant against mechanical damage.

The connector body may be designed in different ways, and depending on the design of the connector body, the mating interface and other components of the charging connector may be fixed in the connector body in different ways. In this respect, according to one implementation the connector body is comprised of at least two half shells, perhaps exactly two half shells, in which the mating interface with the electrical connectors are held and which are held together with at least one screw which is located outside the mating interface.

According to this implementation, the connector body is built of two separate half shells which are assembled in a different way than known from conventional connector bodies. For the assembly, the mating interface and other components of the charging connector like DC and control inserts and respective blockers are placed on one half shell. The half shell is built in such a way that the mating interface and the other components are not free to move. Then the second half shell is screwed on top of the first half shell. It is important that the screw or the screws used for screwing the second half shell on top of the first half shell is/are located outside the mating interface, for example, at the side of the half shells.

The main advantage of this kind of assembly is that it is simple and easy to do, and also to manufacture. Moreover, no screws are required to fix the mating interface to the connector body. This is possible due to the designs of the connector body and the mating interface, which are mutually locked. The screws used in the assembly are only used to fix the two half shells together. Further, in various conventional designs, metallic screws are used to fix the mating interface to the connector body. However, it has been realized by the inventors that presence of metal screws in this area negatively impacts the electric field distribution leading to significant electric field enhancements that eventually can induce electric failures, especially when water penetrates into the screw channels.

According to this implementation, for avoiding water ingress the components inside the connector body may be potted with silicone, and draining any water coming into the body by including drain holes in this design. An alternative approach for avoiding water ingress is the use of rubber stripes, similar to o-rings on the contour of the connector body. According to another implementation, water ingress may also be mitigated by extrusions along the contour of one of the half shells and the corresponding pockets along the contour of the other half shell.

According to another implementation, the connector body is comprised of at least one single body, perhaps exactly one single body, in which the mating interface with the electrical connectors are held by at least one screw which is located outside the mating interface. In this concept, the connector body is built as a single piece. The assembly of the mating interface and the other components like DC and control inserts and respective blockers is performed by sliding these components into the connector body from the front.

An O-rings is applied on the front and in the bottom to avoid water ingress. This is one main advantage of this implementation. As in the implementation using two half shells, the screw or the screws which is/are used for fixing the mating interface is/are located outside the mating interface which is advantageous from a dielectric point of view. Further, it may be noted that that this design provides for the possibility of a 4-layer barrier between the screws and the DC+ and DC− poles. The four layers may be the plastic of the Cu cables, the resin from the potting, or air if no potting is used, the plastic material of the DC insert, and the plastic material of the mating interface.

Further, the connector body may be made from different materials. However, according to an implementation the connector body is made from a glass-fiber filled polymer material and/or from a thermoplastic polyurethane (TPU) based material. Regarding materials, most conventional designs are not satisfactory. The materials conventionally used often do not exhibit sufficient toughness, especially in the temperature range required for the charging applications. The use of glass-fiber filled polymer material for the connector body improves the mechanical properties of the connector body. One example for such glass-fiber filled polymer materials is Lexan EXL series from the manufacturer Sabic, for example EXL4019 and/or EXL5689. These materials show excellent balance between stiffness and ductility, i.e., a tensile/flexure modulus of 3 to 4 GPa and high ductility even at temperatures of −30° C. An example for TPU-based materials which are suitable for the present implementation is the Elastollan R series from the manufacturer BASF.

In an embodiment, the connector body may be designed as a single layer structure made of one single material. However, according to an embodiment, the connector body has a multi-layer structure with a stiffer core layer and a softer outer layer. Here, the terms "stiffer" and "softer", respectively, relate to the fact that the core layer is stiffer than the outer layer and that the outer layer is softer than the core layer.

In this way, especially in addition to the selection of more suitable materials for the connector body, it is possible to conceive a multi-layer housing, i.e., a body comprising a stiff core, either patches made of a soft material or an additional outer skin layer made out of a soft material. This may be implemented either on the connector body, or on the mating interface, or on both components. Moreover, such a multi-layer structure does not have to be implemented on the whole body, but may also be applied only in some areas which require additional protection, such as the handle. Hence, according to an implementation the softer outer layer is only partially covering the stiffer core layer.

Such a multi-layer composition is manufactured by multilayer injection molding, also known as overmolding technology, or by double shot molding or by additive manufacturing featuring a two-nozzle feeding system. According to one implementation, the stiffer core layer is made from a glass-fiber filled polymer material. Further, according to one implementation the softer outer layer is rubber based or made from a thermoplastic elastomer.

Figure 1:
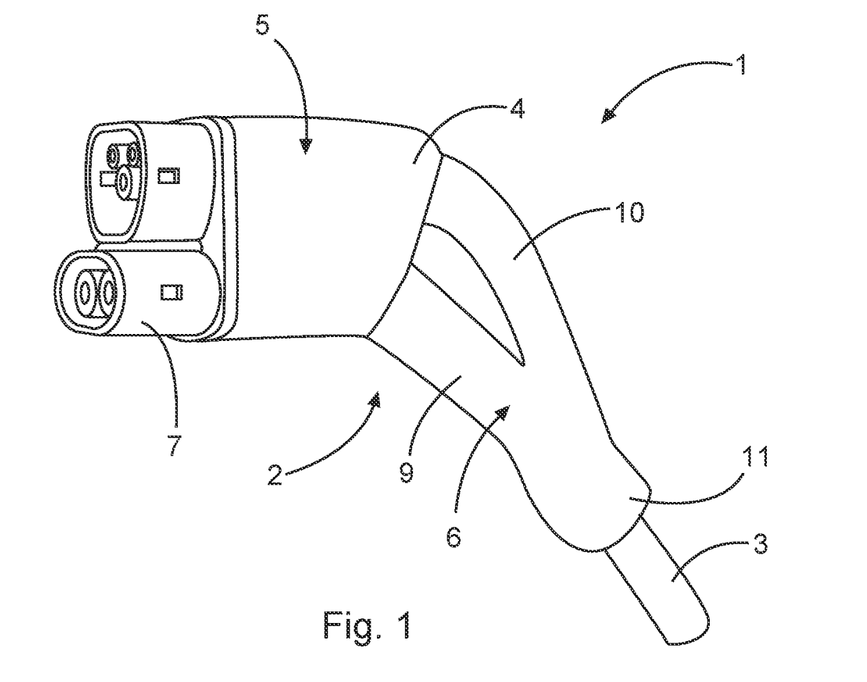
FIG. 1 shows a perspective view of a charging arrangement according to an embodiment of the present disclosure.
Figure 2:
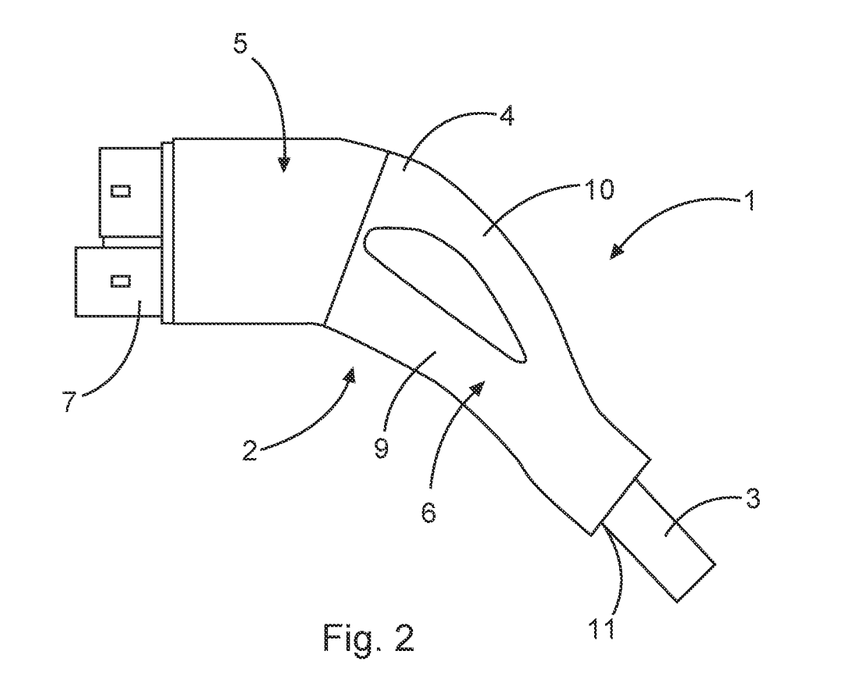
FIG. 2 shows a side view of the charging arrangement of FIG. 1.

In FIGS. 1 and 2 a perspective view and a side view of a charging arrangement 1 according to an embodiment of the present disclosure, respectively, are depicted. This charging arrangement 1 is designed for charging of electric vehicles and comprises a charging connector 2 and a charging cable 3. The charging connector 2 comprises a connector body 4 with a first zone 5 and a second zone 6. The first zone 5 and the second zone 6 are separate from each other but directly adjacent to each other, wherein the first zone 5 of the connector body 4 hosts a mating interface 7 with electrical contacts 8 for mating the charging connector 2 with a corresponding socket of an electric vehicle.

To enable such charging, the electrical contacts 8 are electrically coupled to the charging cable 3. The second zone 6 of the connector body 4 comprises a tube 9 in which the charging cable 3 is guided from an opening 11 of the tube 9 which is arranged on that side of the second zone 6 of the connector body 4 which is faced away from the first zone 5 of the connector body 4 to the electrical contacts 8 which are located in the first zone 5 of the connector body 4. Further, the second zone 6 of the connector body 4 also comprises a handle 10 for grabbing the charging connector 4 with a human hand. The handle 10 is separate from the tube 9, whereby the second zone 6 of the connector body 4 is Y-shaped wherein the tube 9 is formed by one upper leg and the lower leg of the Y and the handle 10 is formed by the other upper leg of the Y.

Hence, the connector body 4 comprises two separate zones 5, 6. In the second zone 6, the handle 10 is separated from the tube 9 that contains the charging cable 3. This is advantageous, because in case of overheating of the charging cable 3 during charging, this avoids potential burns to the hand of an end-user. Further, for better mechanical resistance the shape of the handle 10 and the tube 9 for the charging cable 3 is designed to be smooth and Y-shaped. This second zone 6 of the connector body 4, i.e., the part containing the handle 10 and the tube 9 for the charging cable 3, is conceptually separated from the first zone 5. The first zone 5 contains the remaining elements, i.e., the mating interface 7 and further components of the charging connector 2.

According to one or more embodiments of the disclosure described herein, there are two different ways to assemble the charging arrangement 1. This has an influence on the final design of the connector body 4. The two different assembly concepts are explained below.

Figure 3:
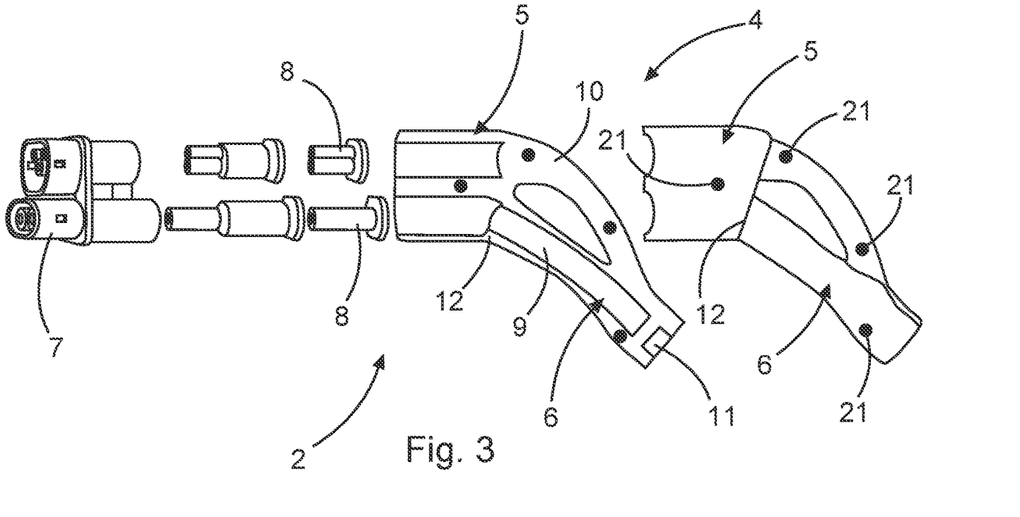
FIG. 3 shows an exploded view of a of a charging connector according to an embodiment of the present disclosure with two half shells.
Figures 4A, 4B:
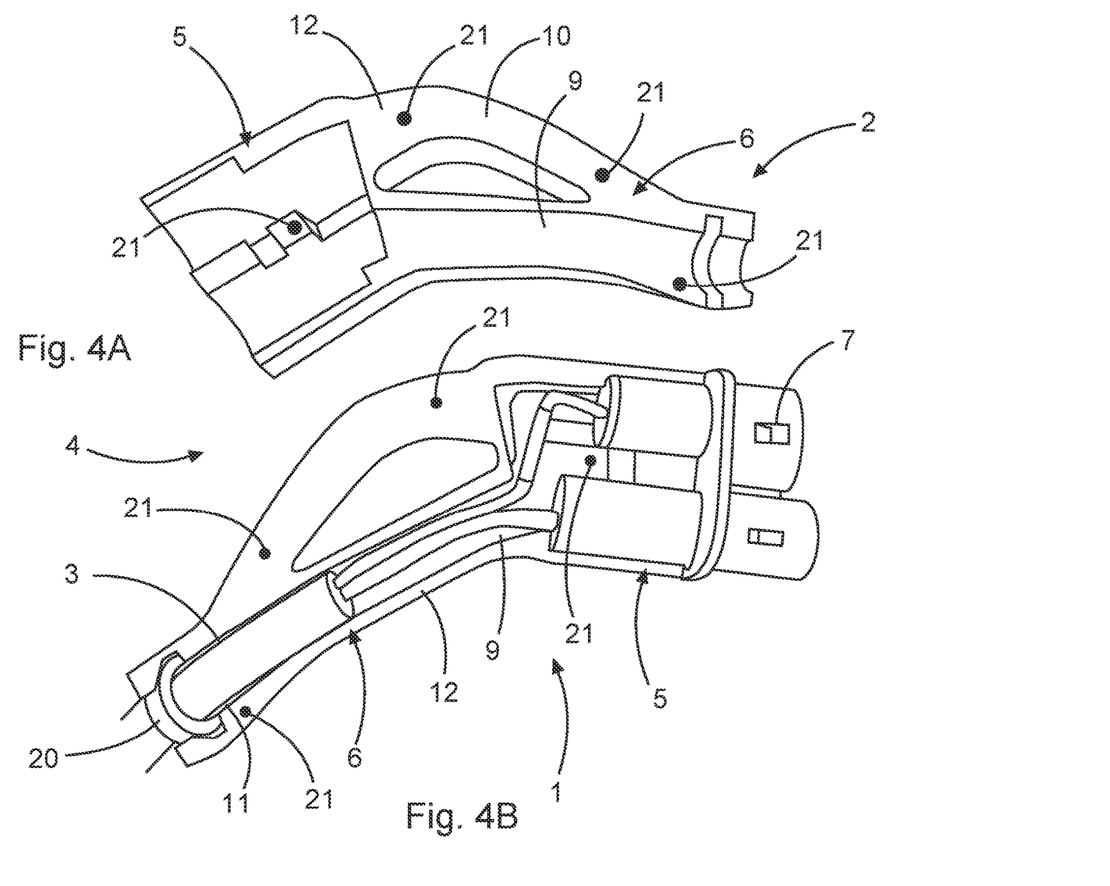
FIG. 4A and FIG. 4B show the charging connector of FIG. 3 in an assembly state.
Figure 7:
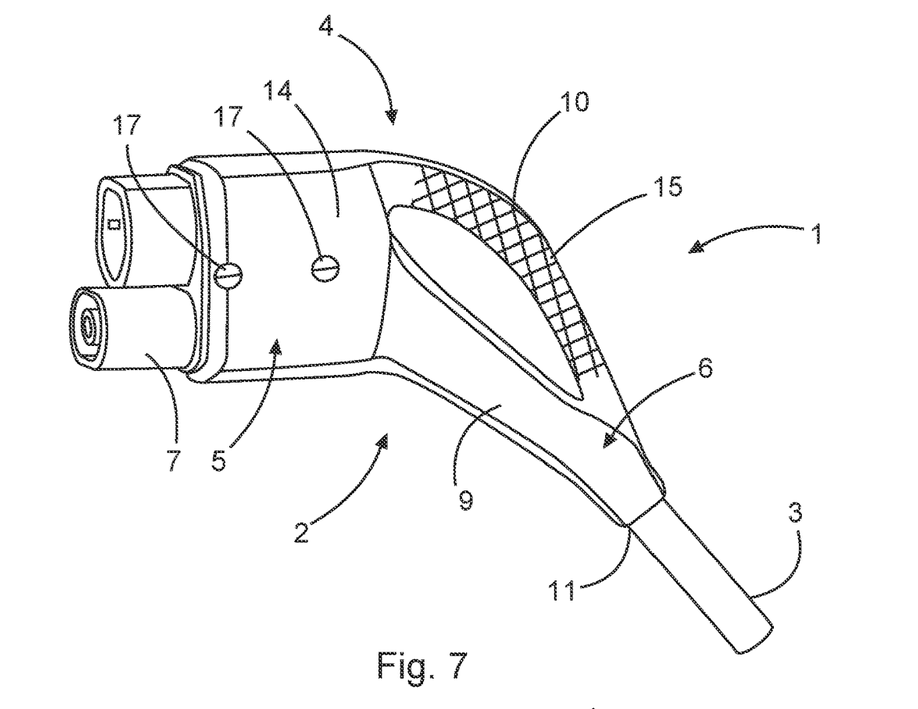
FIG. 7 shows a perspective view of a charging arrangement according to an embodiment of the present disclosure comprising a multi-layer structure with a stiffer core layer and a softer outer layer.

With respect to the first assembly concept, FIG. 3 shows an exploded view of a of a charging connector 2 according to one embodiment of the present disclosure with two half shells 12, and FIG. 4 shows the charging connector 2 of FIG. 3 in an assembly state. In this concept, the connector body 4 is built from two separate half shells 12. For the assembly, the mating interface 7 and the other components of the charging connector 2 are placed on one half shell 12. This half shell 12 is built in such a way that the mating interface 7 and the other components of the charging connector 2 are not free to move. This can especially be seen from FIG. 4 which shows structures in the connector body 4 which exactly match the design of the mating interface 7 and the other components which have to be arranged inside the connector body 4. Then the second half shell 12 is screwed on top of the first half shell 12. Therefore, screw holes 21 are provided in which screws 17 (depicted in FIG. 7) are screwed.

The main advantage of this kind of assembly is that it is simple and easy to do and to manufacture. Moreover, no screws are needed to fix the mating interface 7 to the connector body 4. This is possible due to the design of the connector body 4, and the mating interface 7, which are mutually locked. The screws 17 used in the assembly are only used to fix the two half shells 12 together.

Figure 5:
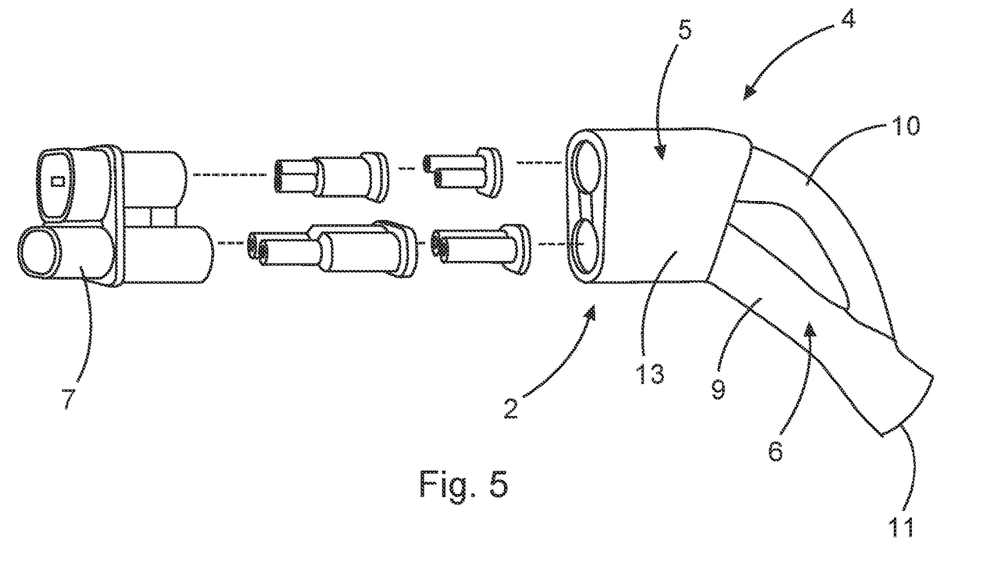
FIG. 5 shows an exploded view of a of a charging connector according to an embodiment of the present disclosure with a single body.
Figure 6:
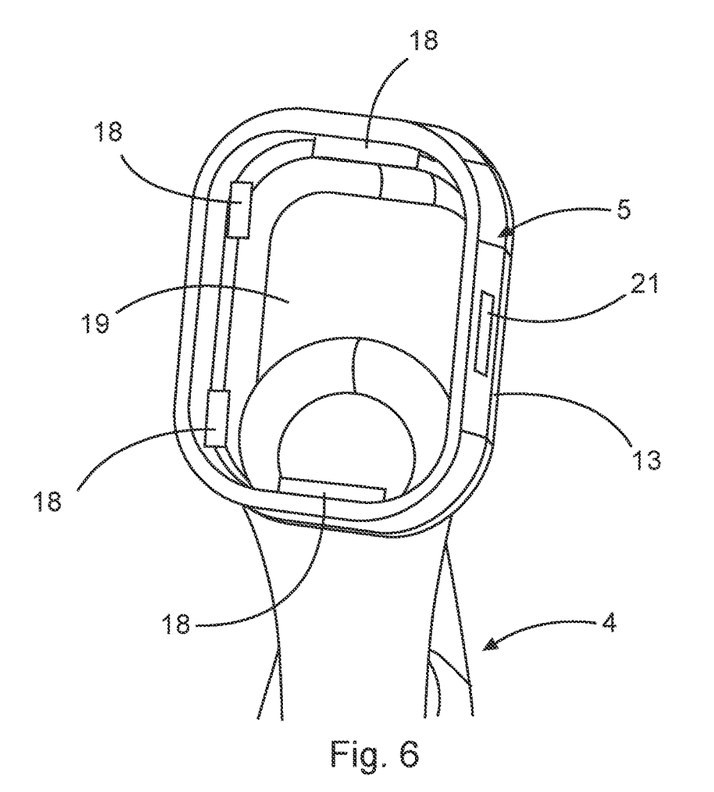
FIG. 6 shows a perspective view of the front of the body of the charging connector of FIG. 5.

The second assembly concept is depicted in FIGS. 5 and 6, wherein FIG. 5 shows an exploded view of a of a charging connector 2 according to one embodiment of the present disclosure with a single body 13, and FIG. 6 shows a perspective view of the front of the connector body 4 of the charging connector 2 of FIG. 5. According to this concept, the connector body 4 is built as a single piece. The assembly of the mating interface 7 and the other components is performed by sliding these components into the connector body 4 from the front. As in the embodiment using two half shells 12, the screws 17 which are used for fixing the mating interface 7 are located outside the mating interface 7 which is also advantageous for dielectric issues. As can especially be seen from FIG. 6, supports 18 are arranged inside the opening 19 of the connector body 4 for the mating interface 7 and the other components. In this way together with the screws 17 which are inserted through the screw holes 21 in the sides of the connector body 4 movement of the mating interface 7 and the other components like inserts and blockers is avoided.

The connector bodies 4 according to one or more embodiments of the present disclosure described here are made from glass-fiber filled polymer material or from a thermoplastic polyurethane (TPU) based material. The use of glass-fiber filled polymer material for the connector body 4 improves the mechanical properties of the connector body 4. One example for such glass-fiber filled polymer materials is Lexan EXL series from the manufacturer Sabic, for example EXL4019 and/or EXL5689. These materials show excellent balance between stiffness and ductility, i.e., a tensile/flexure modulus of 3 to 4 GPa and high ductility even at temperatures of −30° C. An example for TPU-based materials which are suitable for the present embodiments is the Elastollan R series from the manufacturer BASF.

The connector bodies 4 shown in FIGS. 1 to 6 are made from such materials as single layer structure made of one single material. In contrast to that, in FIG. 7 a connector body 4 is depicted which has a multi-layer structure with a stiffer core layer 14 and a softer outer layer 15. Here, the stiffer core layer 14 is made from glass-fiber filled polymer material or from a TPU-based material as mentioned above. In this way, a complete connector body 4 is formed. As can be seen from FIG. 7, the handle 10 additionally comprises a softer outer layer 15 which is rubber based or made from a thermoplastic elastomer. This further protects the handle 10 and makes the handle 10 easier to grab with a human hand.

Figure 8:
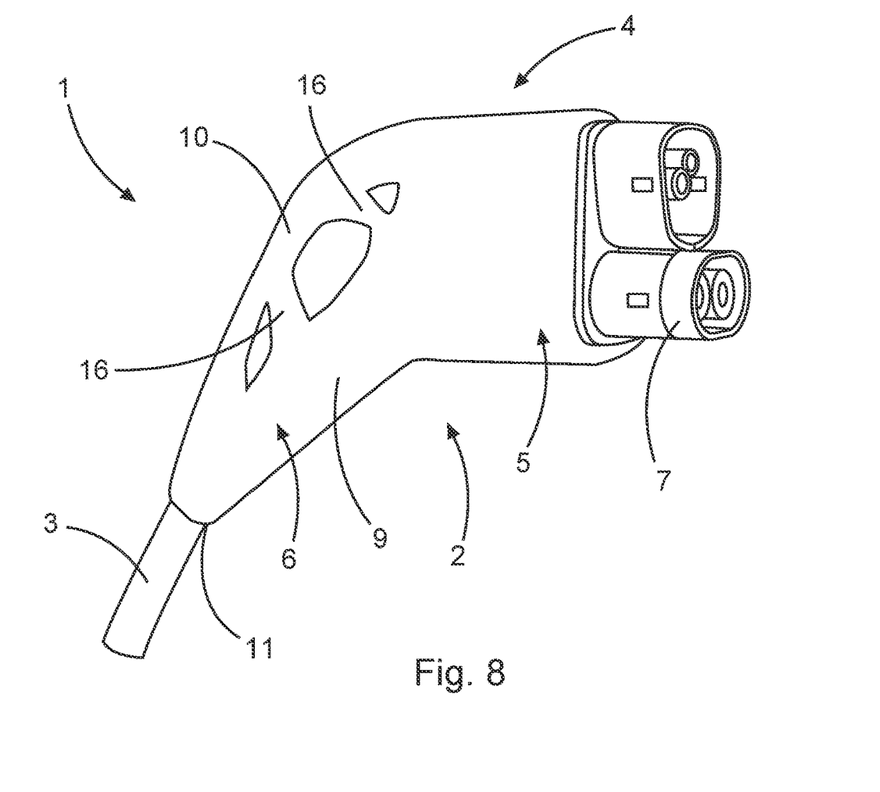
FIG. 8 shows a perspective view of a charging arrangement according to an embodiment of the present disclosure comprising a handle with bridges for reinforcing the handle.

Finally, FIG. 8 shows a perspective view of a charging connector according to an embodiment of the present disclosure which comprises a handle 10 with additional bridges 16 for reinforcing the handle 10. These bridges 16 are arranged in such a way that there is still enough space for grabbing the handle 10 with a human hand.

While one or more embodiments of the present disclosure have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS LIST 1 charging arrangement
2 charging connector
3 charging cable
4 connector body
5 first zone
6 second zone
7 mating interface
8 electrical contacts
9 tube
10 handle
11 opening for cable
12 half shells
13 single body
14 stiffer core layer
15 softer outer layer
16 bridge
17 screws
18 supports
19 opening for mating interface
20 stress relief element
21 screw holes

What is claimed is:

1. A charging arrangement for charging of electric vehicles, comprising a charging connector and a charging cable, wherein:
  the charging connector comprises a connector body with a first zone and a second zone, the first zone and the second zone being separate from each other,
  the first zone of the connector body hosts a mating interface with electrical contacts for mating the charging connector with a corresponding socket of an electric vehicle, the electrical contacts being electrically coupled to the charging cable, and
  the second zone of the connector body comprises a tube in which the charging cable is guided from an opening of the tube that is arranged on a side of the second zone of the connector body that faces away from the first zone of the connector body to the electrical contacts, the electrical contacts being located in the first zone of the connector body, and a handle for grabbing the charging connector with a human hand, the handle being separate from the tube, wherein:
  the second zone of the connector body is Y-shaped wherein the tube is formed by one upper leg and the lower of the Y and the handle is formed by the other upper leg of the Y, and
  the connector body has a multi-layer structure with a stiffer core layer and a softer outer layer,
  wherein the stiffer core layer is made from a glass-fiber filled polymer material or from a TPU-based material.

2. The charging arrangement for charging of electric vehicles according to claim 1, wherein the first zone and the second zone are directly adjacent to each other.

3. The charging arrangement for charging of electric vehicles according to claim 2, wherein the second zone of the connector body is attached to the first zone of the connector body with both upper ends of the upper legs of the Y.

4. The charging arrangement for charging of electric vehicles according to claim 1, wherein the tube is curved.

5. The charging arrangement for charging of electric vehicles according to claim 1, wherein the lower end of the Y comprises the opening of the tube that receives the charging cable.

6. The charging arrangement for charging of electric vehicles according to claim 1, wherein the two upper legs of the Y are connected to each other by at least one bridge for reinforcing the handle.

7. The charging arrangement for charging of electric vehicles according to claim 1, wherein the connector body comprises at least two half shells in which the mating interface with the electrical connectors are held and that are held together with at least one screw that is located outside the mating interface.

8. The charging arrangement for charging of electric vehicles according to claim 1, wherein the connector body is comprised of at least one single body in which the mating interface with the electrical connectors are held by at least one screw that is located outside the mating interface.

9. The charging arrangement for charging of electric vehicles according to claim 1, wherein the connector body is made from glass-fiber filled polymer material and/or from a thermoplastic polyurethane based material.

10. The charging arrangement for charging of electric vehicles according to claim 1, wherein the softer outer layer is only partially covering the stiffer core layer.

11. The charging arrangement for charging of electric vehicles according to claim 1, wherein the softer outer layer is rubber based or made from a thermoplastic elastomer.

12. The charging arrangement for charging of electric vehicles according to claim 1, wherein the multilayer structure is achieved by multilayer injection molding or by double shot molding or by additive manufacturing featuring a two-nozzle feeding system.

* * * * *